US012652535B1

(12) United States Patent (10) Patent No.: US 12,652,535 B1
Nakkabi et al. (45) Date of Patent: Jun. 9, 2026

(54) MULTI-DEVICE USER IDENTITY VALIDATION BASED ON BEHAVIORAL SIGNAL FIDELITY

(71) Applicant: Plurilock Security Solutions Inc., Victoria (CA)

(72) Inventors: Youssef Nakkabi, Victoria (CA); Paulo Quinan, Victoria (CA); Jord Tanner, Sooke (CA); Ian Paterson, Victoria (CA)

(73) Assignee: Plurilock Security Solutions Inc., Victoria (CA)

( * ) Notice: Subject to any disclaimer, the term of this patent is extended or adjusted under 35 U.S.C. 154(b) by 337 days.

(21) Appl. No.: 17/690,352

(22) Filed: Mar. 9, 2022

Related U.S. Application Data

(60) Provisional application No. 63/158,928, filed on Mar. 10, 2021.

(51) Int. Cl.
 *H04W 12/065* (2021.01)
 *G06F 21/31* (2013.01)
 *G06F 21/35* (2013.01)
 *G06F 21/41* (2013.01)
 *H04L 9/40* (2022.01)
 *H04W 12/63* (2021.01)
 *H04W 12/68* (2021.01)

(52) U.S. Cl.
 CPC ........ *H04W 12/065* (2021.01); *G06F 21/316* (2013.01); *G06F 21/35* (2013.01); *G06F 21/41* (2013.01); *H04L 63/0853* (2013.01);

*H04L 63/107* (2013.01); *H04W 12/63* (2021.01); *H04W 12/68* (2021.01)

(58) Field of Classification Search
 CPC ... H04W 12/065; H04W 12/63; H04W 12/68; G06F 21/316; G06F 21/35; G06F 21/41; H04L 63/0853; H04L 63/107
 See application file for complete search history.

(56) References Cited

U.S. PATENT DOCUMENTS

| 11,184,766 | B1 * | 11/2021 | Lord | G06V 10/75 |
| 2012/0268241 | A1 * | 10/2012 | Hanna | G06F 21/32 |
| | | | | 340/5.52 |
| 2013/0269013 | A1 * | 10/2013 | Parry | G06F 21/316 |
| | | | | 726/7 |

(Continued)

OTHER PUBLICATIONS

Gomi, H.; Yamaguchi, S.; Ogami, W.; Teraoka, T.; Higurashi, T.; "Context-Aware Authentication Using Co-Located Devices," 18th IEEE Int'l Conf on Trust, Security and Privacy in Computing and Communications/13th IEEE Int'l Conf on Big Data Science and Engineering, Aug. 5-8, 2019, Rotorua, New Zealand, pp. 304-311.*

(Continued)

*Primary Examiner* — Victor Lesniewski
(74) *Attorney, Agent, or Firm* — Thompson Hine LLP

(57) ABSTRACT
Various implementations disclosed herein include devices, systems, and methods that identify users based on input/ sensor data. This may involve monitoring user identity using multiple signals from multiple devices (e.g., laptop keyboard, mobile device movement, facial recognition, etc.). The signals may be used to identify the user based on the current circumstances (e.g., signal fidelity). For example, the circumstances may change as one signal degrades and another signal increases in quality.

19 Claims, 3 Drawing Sheets

(56)         References Cited

U.S. PATENT DOCUMENTS

| | | | | |
|---|---|---|---|---|
| 2014/0040989 A1* | 2/2014 | Davis | ..................... | H04L 63/10 |
| | | | | 726/4 |
| 2014/0333413 A1* | 11/2014 | Kursun | ................. | G06V 40/70 |
| | | | | 382/117 |
| 2016/0110528 A1* | 4/2016 | Gupta | ................... | G06F 21/577 |
| | | | | 726/19 |
| 2016/0239649 A1* | 8/2016 | Zhao | ................... | H04W 12/065 |
| 2019/0156345 A1 | 5/2019 | Chen et al. | | |
| 2019/0220583 A1 | 7/2019 | Douglas et al. | | |
| 2019/0332756 A1 | 10/2019 | Khitrov et al. | | |
| 2020/0136826 A1* | 4/2020 | Sharma | ................... | H04L 63/08 |
| 2020/0285721 A1* | 9/2020 | Gosalia | ................... | G06F 21/34 |
| 2020/0322330 A1 | 10/2020 | Lynn et al. | | |
| 2020/0412703 A1* | 12/2020 | Kohli | ................. | G06F 21/6245 |
| 2021/0194864 A1* | 6/2021 | Rao | ......................... | H04L 63/08 |
| 2021/0224374 A1* | 7/2021 | Fong | ..................... | H04L 9/0869 |
| 2022/0232084 A1* | 7/2022 | Shetty | ................... | H04W 12/71 |
| 2024/0169047 A1* | 5/2024 | Smith-Creasey | ... | H04L 63/0861 |
| 2024/0314174 A1* | 9/2024 | Becker | ................. | H04W 12/33 |

OTHER PUBLICATIONS

Smith-Creasey, M.; Rajarajan, M.; "A novel scheme to address the fusion uncertainty in multi-modal continuous authentication schemes on mobile devices," International Conference on Biometrics (ICB), Jun. 4-7, 2019, Crete, Greece, 8 pages.*

Wang, Shixuan, et al.; "Quality-based Score Level Fusion for Continuous Authentication with Motion Sensor and Face"; ICCSP 2020, Jan. 10-12, 2020, Nanjing, China; pp. 58-62.

Abuhamad, Mohammad, et al.; "Sensor-based Continuous Authentication of Smartphones' Users Using Behavioral Biometrics: A Contemporary Survey"; arXiv:2001.08578v2 [cs:CR] May 10, 2020; pp. 1-19.

\* cited by examiner

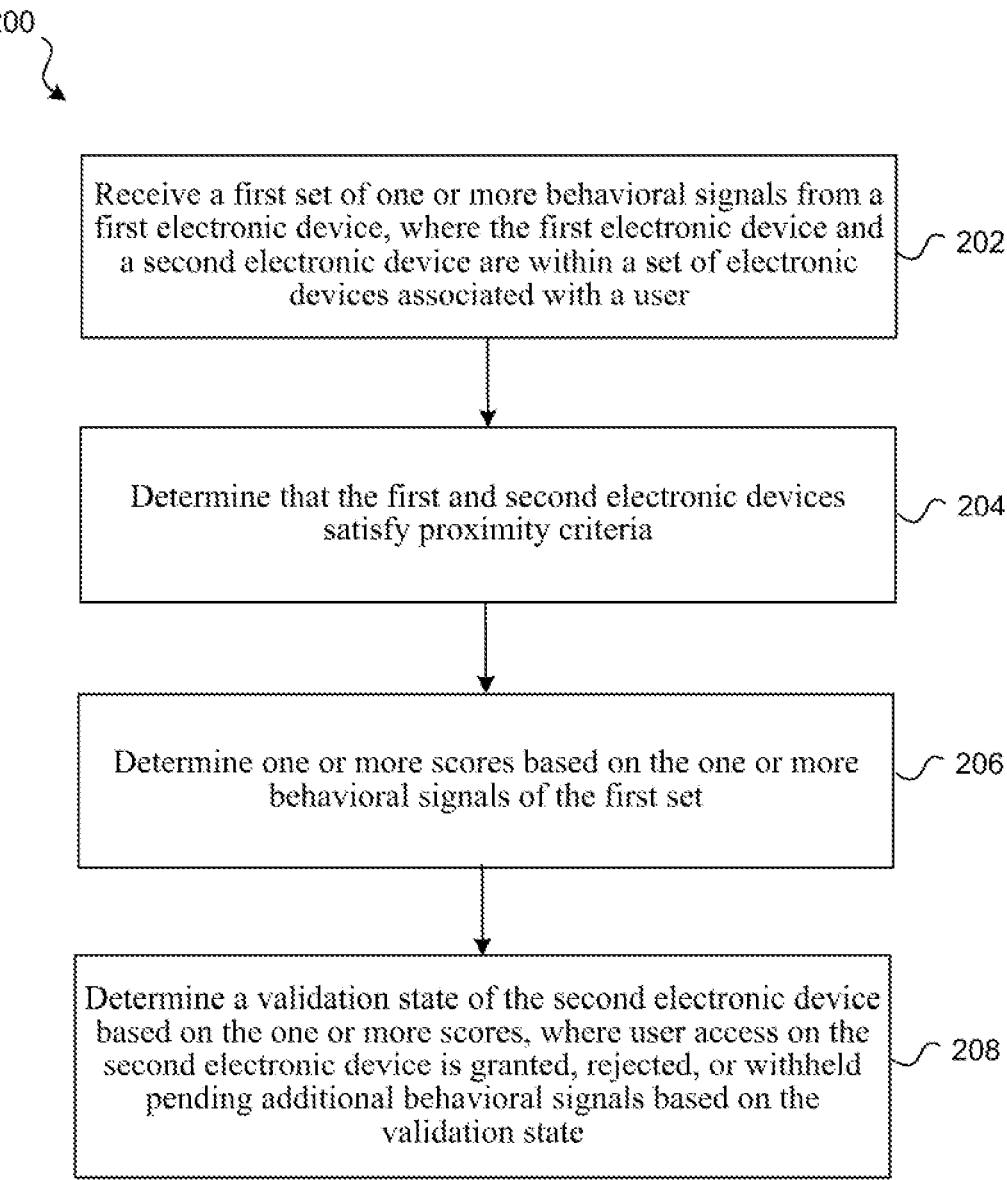

200

Receive a first set of one or more behavioral signals from a first electronic device, where the first electronic device and a second electronic device are within a set of electronic devices associated with a user ⌒ 202

Determine that the first and second electronic devices satisfy proximity criteria ⌒ 204

Determine one or more scores based on the one or more behavioral signals of the first set ⌒ 206

Determine a validation state of the second electronic device based on the one or more scores, where user access on the second electronic device is granted, rejected, or withheld pending additional behavioral signals based on the validation state ⌒ 208

FIG. 2

Device 600

MULTI-DEVICE USER IDENTITY VALIDATION BASED ON BEHAVIORAL SIGNAL FIDELITY

RELATED APPLICATIONS

This application claims the benefit of U.S. Provisional Application Ser. No. 63/158,928 filed Mar. 10, 2021 and entitled "Multi-Device User Identity Validation Based on Behavioral Signal Fidelity," which is incorporated herein in its entirety.

TECHNICAL FIELD

The present disclosure generally relates to identifying users of electronic devices and, in particular to, devices and methods for identifying users using multiple electronic devices during adjacent or overlapping time periods.

BACKGROUND

Various techniques assess input and sensor data of users of electronic devices to identify those users. Existing techniques for identifying users of multiple electronic devices may have various deficiencies.

SUMMARY

Various implementations disclosed herein include devices, systems, and methods that identify users based on behavioral signals. This may involve monitoring user identity using multiple signals from multiple devices (e.g., laptop keyboard, mobile device movement, facial recognition, etc.). The signals may be used to identify the user based on the current circumstances (e.g., signal fidelity). For example, the circumstances may change as one signal degrades and another signal increases in quality. For example, a user may place his phone on a desk and start using a workstation keyboard. At that point, the behavioral signal from the mobile may become weak, and the behavioral signal from the keyboard may become strong. The workstation can initially communicate with the mobile as the user walks up to confirm that identity of the user and thus may not need to require that the user provide login information. As the user sets the mobile down, the mobile will stop collecting as much behavioral data about the user (due to being still and sensors not as directly obtaining user data) but the user may start typing and using the mouse of the workstation. The laptop can then continue to determine the identity of the user based on those inputs (e.g., the pattern/ timing) of the inputs. If the user picks up the mobile again, identification may switch back to using the data from the mobile. Data from multiple devices may also be used simultaneously (e.g., via a selection and/or weighting scheme) in appropriate circumstances.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is a flow chart of an exemplary method of multi-device user identity validation in accordance with some implementations.

Figure 1:
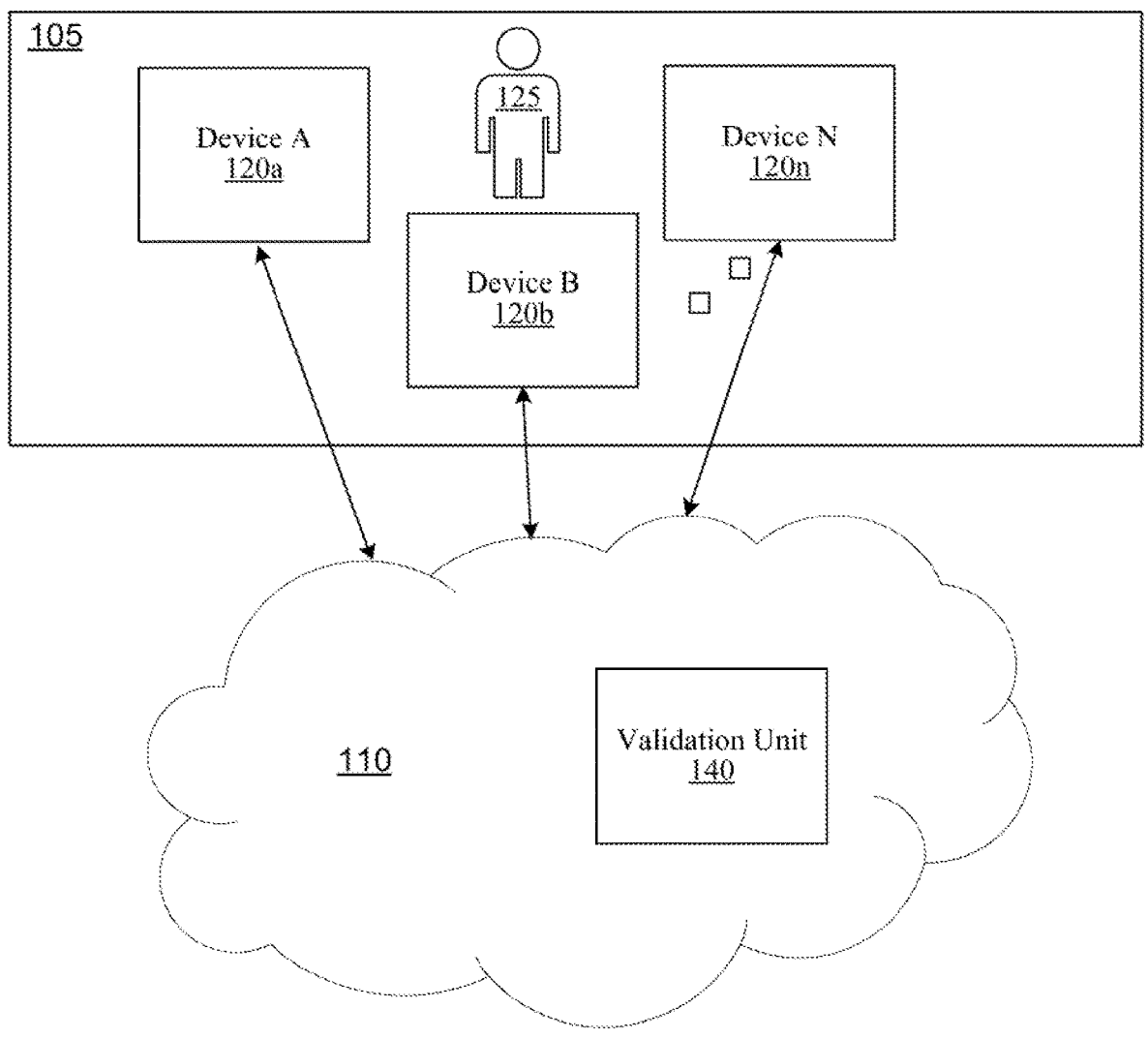
FIG. 1 illustrates exemplary electronic devices used according to multi-device user identity validation in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates exemplary electronic devices A-N 120*a-n* within an environment 105. In this example, each of the devices A-N 120*a-n* is accessed and used at discrete and potentially overlapping times by a user 125 based on validation of the user's identity on one or more of the devices A-N 120*a-n*. For example, the user 125 may use device A 120*a* during the time interval from 6:00-6:45, device B 120*b* during the time interval from 6:30-8:00 etc. Use of the devices A-N 120*a-n* may not be continuous during such intervals, e.g., the user may only be providing input and/or viewing output on device A 120*a* during some of the time during the time interval from 6:00-6:45.

The devices 120*a-n* communicate with validation unit 140 in network 110 to validate the identity of the user 125 to allow the user 125 to use one or more of the devices A-N 120*a-n*. Validation unit 140 may identify the user 125 based on behavioral signals captured by input devices and/or sensors on the devices A-N 120*a-n*. This may involve monitoring user identity using multiple signals from the multiple devices A-N 120*a-n* using various types of validation (e.g., validation based on laptop keyboard usage, mobile device movement, image-based facial recognition, etc.). The signals may be used to identify the user based on the current circumstances (e.g., signal fidelity). For example, the circumstances may change as one signal degrades and another signal increases in quality. For example, a user may discontinue use of device A 120*a* and start using device B 120*b*. At that point, the behavioral signal from the device A 120*a* may decrease in fidelity, and the behavioral signal from device B 120*b* may become increase in fidelity. The devices A-N 120*a-n* may communicate with one another for validation purpose—to confirm that identity of the user and thus may avoid or minimize manual user validation, e.g., entry of passwords, etc. Data from the multiple devices A-N 120*a-n* may also be used simultaneously (e.g., via a selection and/or weighting scheme) for user validation in appropriate circumstances.

Some implementations confirm, with some degree of confidence, a user's identity across different the devices A-N 120*a-n* based on available behavioral signals. The confidence in the various behavior signals (e.g., their fidelity) may depend upon various circumstances and may be taken into account in assessing the user's identity. The higher the confidence degree in the one or more behavioral signals, the more likely the user identity is valid. In some implementations, based on one of the devices A-N 120*a-n* confirming the user identity, another device that is associated with that user 125 can inherit the user's identity. This inheritance may only occur in appropriate conditions, e.g., when the devices A-N 120*a-n* are proximate one another, the user 125 has authorized the inheritance, the user is within a particular location, e.g., home, school, work, etc., the devices are in communication with one another via Bluetooth or connected on the same local area network (LAN), etc.

Some implementations use one or more behavior signals from a device A 120*a* to determine a validation state for device B 120*b* when the devices are within a given proximity of one another. Based on the validation state, user access on the device B 120*b* is granted, rejected, or withheld pending additional behavioral signals. Fidelity of the signals may be used to select which behavior signals to use or how to weight those behavioral signals (or scores derived therefrom). In some implementations, a user identity is assessed with respect to allowing use of device B 120*b* using behavioral signals from device A 120*a* as the device B 120*b* switches from an idle state to an active state. In other implementations, behavioral signals from two or more electronic devices, e.g., devices A-N 120*a-n*, during a given time period are assessed with respect to allowing use of one or more devices associated with a user 125. The different behavioral signals (or scores derived therefrom) may be selected for use or weighted based on assessing the fidelity of the respective signals (or scores).

FIG. 2 is a flow chart of an exemplary method 200 of multi-device user identity validation. In some implementations, a device such as electronic device 600 (FIG. 3) or a combination of devices performs the steps of the method 200. In some implementations, method 200 is performed on a desktop or server device. The method 200 is performed by processing logic, including hardware, firmware, software, or a combination thereof. In some implementations, the method 200 is performed on a processor executing code stored in a non-transitory computer-readable medium (e.g., a memory).

At block 202, the method 200 receives a first set of one or more behavioral signals from a first electronic device, where the first electronic device and a second electronic devices are within a set of electronic devices associated with a user. This may involve a user starting or increasing use of a second device (d2) (e.g., a previously idle device) while using, or just after using, a first device (d1). The set of devices may be a realm of devices that includes devices that include input devices and/or sensors capable of obtaining behavioral signals used to confirm and/or devices that are capable of inheriting a valid identity of a user. The behavioral signals may include data from input devices (e.g., keyboard, mouse, UBA (User behavior analytics) data sources, etc.), motion sensors (e.g., accelerometer, gyroscope and magnetometer), environmental sensors (e.g., camera, microphone, light sensor, thermometer, barometer and proximity sensor), position sensors (e.g., Global Navigation Satellite System (GNSS) such as GPS, GLONASS, etc.)), and/or physiological data sensor (e.g., heartbeat, breathing rate, ECG, wearable sensors).

At block 204, the method 200 determines that the first and second electronic devices satisfy a proximity criteria. For example, this may involve determining that the devices are within a proximity of one another given a predefined perimeter or distance threshold. Proximity may be assed using Bluetooth, Wireless network (signal strength), GNSS, low-frequency sound, NFC, and/or indirectly through intermediary device data that can be used to assess proximity.

In accordance with the first and second electronic devices satisfying the proximity criteria, at block 206 the method 200 determines one or more scores (e.g., corresponding to confidence in a user identity) based on the one or more behavioral signals of the first set and, at block 208, determines a validation state of the second electronic device based on the one or more scores. This may involve aggregating the scores based on the fidelity of each score, e.g., using only scores above a threshold fidelity level or weighting scores based on fidelity. User access on the second electronic device is granted, rejected, or withheld pending additional behavioral signals based on the validation state. For example, this may involve confirming a user identity and granting access on d2, rejecting the user identity and not granting access on d2, or partially confirming the user identity and requesting additional behavioral signals from d2 to verify and confirm the identity.

In some implementations, fidelity of the behavioral signals from the first device is used to select and/or weight how those signals are used in determining the validation state of the second device. Determining the one or more scores may involve determining an aggregate score based on the one or more behavioral signals of the first set, where the validation state is determined based on the aggregate score.

In one example, determining such an aggregate score may involve determining a signal-specific score for each of the one or more behavioral signals of the first set, determining a fidelity of each of the signal-specific scores, identifying a subset of the signal-specific-scores that satisfy a selection criteria based the fidelity of each of the signal-specific scores, and generating the aggregate score by aggregating the subset of signal-specific-scores.

In another example, determining such an aggregate score may involve determining a signal-specific-score for each of the one or more behavioral signals of the first set, determining a fidelity of each of the signal-specific scores, weighting the signal-specific-scores based on the fidelity of each of the signal specific scores, and generating the aggregate score by aggregating the subset of signal-specific-scores.

In some implementations, the validation state is determined as the second device switches from an idle state to an active state. A device in an active state is a device that is currently in use and providing behavioral signals. A device in an idle state is not generating any behavioral signals. Thus, in some implementations, while the second device is in the idle state, no behavioral signals are received from the second electronic device and while the second device is in the active state, one or more behavioral signals are received from the second electronic device.

In some implementations, a user identity check is initiated and/or performed when a user switches from an active device to an idle device. The idle device inherits the user's identity from an active device using proximity and the score from sensors generating high fidelity signals. One example involves the following process:

The user is using the active device (d1).

The user starts using the idle device (d2).

Devices d1 and d2 ascertain proximity given a predefined perimeter.

d2 becomes active and starts collecting behavioral signals.

The identity validator server processes the data from d1 and calculates a score for each available signal.

An aggregated score is computed (e.g., using only on high fidelity signals or using signals weighted based on fidelity).

Based on the aggregated score from d1, one of the following scenarios happens:

A validator server confirms the user identity and grants it to d2.

The validator server rejects the user identity and does not grant it to d2.

The validator server partially confirms the user identity requests additional behavioral signals from d2 to verify and confirm the identity.

Some implementations determine a validation state in a circumstance during which behavioral signals are received from both a first electronic device and a second electronic device. Accordingly, in the method described above, a second set of one or more behavioral signals may be received from the second electronic device where the first set and the second set correspond to a same time period. The one or more scores are determined based on the behavioral signals of the first set and the second set. This may involve determining an aggregate score based on the one or more behavioral signals of the first set and the one or more behavioral signals of the second set, where the validation state is determined based on the aggregate score.

In one example, such an aggregate score is determined by determining a signal-specific-score for each of the one or more behavioral signals of the first set and the second set, determining a fidelity of each of the signal-specific scores, identifying a subset of the signal-specific-scores that satisfy a selection criteria based on the fidelity of each of the signal-specific scores, and generating the aggregate score by aggregating the subset of signal-specific-scores.

In another example, such an aggregate score is determined by determining a signal-specific-score for each of the one or more behavioral signals of the first set and the second set, determining a fidelity of each of the signal-specific scores, weighting the signal-specific-scores based on the fidelity of each of the signal specific scores, and generating the aggregate score by aggregating the subset of signal-specific-scores.

In some implementations, behavioral signals from one or more electronic devices are used to identify a user to enable the initial and/or continued use of one or more devices associated with the user or services provided via those devices. The identification may involve comparing a characteristic exhibited by the user data with the characteristic in prior data associated with the user. As examples, the identifying may involve comparing timing of sequences of keystrokes, comparing timing of mouse position events, comparing timing of touchscreen events, and/or comparing timing of user hand positions during hand gesturing as captured in a sequence of images. Accordingly, the behavioral signals may correspond to timing and/or patterns from which the user identities may be determined. As additional examples, input data may include a time sequence of keystrokes that correspond to a particular user's typing pattern, a time sequence of mouse positions that correspond to a particular user's mouse use behavior, and/or data that corresponds to touchscreen events (x,y,z axis, pressure, duration). As another example, sensor data may correspond to a sequence of images or frames of a user's hand during hand gesture input.

Some implementations confirm the identity of the user based on interpreting data continuously (e.g., on an ongoing basis as new data is obtained). The data may be interpreted by, for example, comparing the data (e.g., event data) to a stored profile. In some implementations, the comparison may compare the data to a stored profile using sliding window comparisons. In some implementations, a profile hierarchy is used and the comparison involves comparing the data against a stored profile based on the hierarchy. In some implementations, a profile hierarchy is used. This may involve maintaining a hierarchy of profiles for a given user. The following provides an example hierarchy: Username>>Device Type (Keyboard, Mouse, Touchscreen, Other)>>Device ID (USB1, Bluetooth2, etc.). Remote peripherals may also be mapped to a known hardware device ID, even if abstracted by a virtual USB device.

In some implementations, one or more scores are determined based on behavioral signals. Such a score may provide a measure of confidence in a user's purported identity and may be adjusted over time as additional data is received. A score, in some implementations, is produced by using data (e.g., regarding human input, motion, peripheral device) to calculate a score, either on a per device basis or as part of a larger score for multiple devices. Cognitive, environmental, contextual and other signals may be used to inform the weighting of human input variables and/or the score itself. The assessment may also involve monitoring for exact match data streams which may indicate inappropriate or malicious behavior. Trends in scores may also be used to indicate a change in person on a device (e.g., a score that is trending down in confidence may indicating a change in user).

In some implementations, determining signal fidelity comprises determining that a signal is coming from an active sensor and contains behavioral or physiological data from a person. In practice, a high-fidelity signal may be a signal on which decisions can be based with confidence. The specific criteria used to determine whether a signal is high fidelity may be configured according to the requirements of a particular implementation. The following list provides non-limiting examples of criteria used to determine whether a given signal is high-fidelity or not. A keyboard's data may be considered to be of high fidelity if it is being typed on at a minimal keystroke rate. A phone's accelerometer may be considered high fidelity if the phone is being held by a person instead of resting somewhere else. A photo or video taken from a camera for facial recognition may be considered high fidelity if it contains a person's face.

The following examples illustrate multi-device user validation according to one or more of the implementations disclosed herein.

Example 1

In this scenario, the user has two enrolled devices: a cellphone and a laptop and these devices have been previously paired with one another via Bluetooth. An initial authentication phase involves:

1. User unlocks cellphone and opens company's secure mobile app
2. App contacts the validator server to obtain user's risk score from any device in the vicinity
3. Since the user has not used any other enrolled device in the vicinity that could provide a risk score, the server assesses the user as having a high-risk score.
4. Based on that information, the app prompts the user for an extra authentication information, e.g., passwords, biometric data, etc.
   4.1. alternatively: the app redirects user to a separate sign-in page which prompts the user for extra authentication information
5. The user provides said authentication, which the app forwards to a validation server.
6. AS accepts authentication and reduces user's risk score accordingly
7. App receives a new risk score and grants the user access, and transitions to the continuous authentication state A continuous authentication phase involves:

1. Once the access is granted, the app starts monitoring the available behavioral and physiological signals
2. Collected data is frequently forwarded to the server
3. The server processes the data and calculates a score for each available signal
4. The server filters out signals with low fidelity or weights scores based on signal fidelity. From that, compute the aggregated score
   4.1 side: If the user maintains a low-risk score, access continues as is. However, if the risk score increases above a pre-defined threshold, then access is revoked.

A device switch phase involves:

1. While having a low-risk score, the user moves the cellphone close to a laptop.
2. The user places a cellphone on the desk.
3. User unlocks laptop and opens company's secure desktop app
4. The app contacts the server to obtain the user's risk score
5. Devices ascertain proximity via Bluetooth, which provides highly accurate values.
6. The server confirms that (a) the user's risk score is low on the cellphone, (b) proximity of devices is below a pre-defined perimeter and (c) the user was able to unlock the laptop. Thus it assesses the user as having a low-risk score on the laptop.
7. The app grants the user access and transitions to the continuous authentication state based on that information.

Example 2

This scenario is a continuation of Example 1 in which a malicious insider (adversary) has previously learned the user's cellphone's passcode by shoulder surfing. A malicious device switch attempt occurs:

1. After a while, the user temporarily steps away from the workstation while also leaving the cellphone behind.
2. Since high-fidelity signals were lost, the AS progressively increases the user risk score.
3. Adversary picks up the cellphone, unlocks it and opens the company's secure mobile app.

4. The app contacts the server to obtain the user's risk score in the vicinity
5. AS confirms that (a) proximity of devices is below a pre-defined perimeter and (b) the user (the adversary in this case) was able to unlock the cellphone but also notes that the user's risk score on the laptop was low given it was idle for a while, thus it assesses the user as having a high-risk score on the cellphone
6. Based on that information, the app prompts the user for more than one extra authentication
   6.1. Alternatively: the app redirects user to a server sign-in page which prompts the user to authenticate
7. The adversary cannot provide said factors, and thus access is denied.

Example 3

This scenario is a continuation of Example 1 in which a malicious insider (adversary) has previously learned the user's cellphone's passcode by shoulder surfing. A malicious concurrent access occurs:

1. While the user is actively using the laptop and maintaining a low-risk score, the adversary steals the user's cellphone and takes it a close by, but out-of-sight
2. Adversary unlocks the cellphone and opens the company's secure mobile app
3. The app contacts server to obtain user's risk score in the vicinity
4. The server confirms that (a) user's risk score is low on the laptop, (b) proximity of devices is below a pre-defined perimeter and (c) the user was able to unlock the cellphone, thus it assesses the user as having a low-risk score on the laptop
5. Based on that information, the app grants the user access and transitions to the continuous authentication state A continuous authentication occurs:

1. In this state, the server notes that both devices continue in an active state while the calculated proximity between them is more significant than a pre-defined maximal accepted concurrent usage separation
2. The server increases both risk scores based on each device's history:
   2.1. The laptop's risk score increases only slightly since it had continuous activity and low-risk score throughout
   2.2 The cellphone's risk score increases by a larger amount since its risk score was just inherited from another device without enough time has passed for it to be able to establish a valid local risk score
3. The server notifies both devices of the increased risk and also notifies the laptop that an inherited identity was revoked
4. Upon notification of the higher risk score, the cellphone's app revokes user access which requires the adversary to be able to start authentication from zero
5. Upon notification of the slightly higher risk score, the laptop's app continues to grant the user access
   5.1. side: If the risk score was already borderline, the app might limit access or prompt for an extra authentication
6. The laptop's app displays a notification that access to the cellphone was revoked, thus alerting the user of a possible breach

Example 4

In this scenario, the user has two enrolled devices: a cellphone and a desktop workstation. A workstation has no Bluetooth or other high-accuracy proximity sensor like an NFC chip. The user has performed an initial authentication on the cellphone as described in Example 1. A device switch occurs:

1. While having a low-risk score, the user moves the cellphone near the workstation.
2. The user places a cellphone on the desk.
3. User unlocks workstation and opens company's secure desktop app
4. The app contacts the server to obtain the user's risk score
5. Proximity is ascertained via a combination of IP geolocation, Wifi hotspot/access point geolocation (WiPS/WFPS) and from the cellphone side only possibly GNSS/A-GNSS which in combination provides low accuracy (fidelity) proximity values.
6. The server confirms that (a) user's risk score is low on the cellphone, (b) proximity of devices is below a pre-defined perimeter, but a high margin of error (low fidelity) and (c) the user was able to unlock the workstation, thus it assesses the user as having a medium-risk score on the workstation.
7. Based on that information, the app prompts the user for extra authentication
   7.1. Alternatively: app redirects user to a server sign-in page which prompts the user for authentication
8. The user provides said authentication, which the app forwards to a server
9. The server accepts authentication and reduces user's risk score accordingly
10. App receives a new risk score and grants the user access, and transitions to the continuous authentication state

Example 5

In this scenario, the user has three enrolled devices: a cellphone, a desktop workstation and a smartwatch. The workstation has no Bluetooth or high-accuracy proximity sensor like an NFC chip. The user has performed an initial authentication on the cellphone as described in Example 1. Concurrent access occurs:

1. While having a low-risk score on the cellphone, the user puts on the smartwatch.
2. Smartwatch contacts the server to obtain the user's risk score in the vicinity
3. Devices ascertain proximity via Bluetooth which provides highly accurate values
4. The server confirms that (a) user's risk score is low on the cellphone and (b) proximity of devices is below a pre-defined perimeter but that no unlocking was necessary for the smartwatch thus, it assesses the user as having a medium-risk score on the smartwatch
5. Since no access to sensitive information is accessed directly on the smartwatch, it doesn't request any other authentication factors for the user and just transitions to the continuous authentication state
6. User continuous to use a cellphone
7. After a while, enough high-fidelity data are collected from the smartwatch, which causes its risk score to be reduced.
A device switch occurs:
1. While having a low-risk score in both the cellphone and the smartwatch, user moves close to laptop
2. The user places cellphone on desk.
3. User unlocks workstation and opens company's secure desktop app 4. The app contacts the server to obtain the user's risk score
5. The proximity between the workstation and other devices is ascertained via a combination of IP geolocation, Wifi hotspot/access point geolocation (WiPS/WFPS) and from the cellphone and smartwatch sides, possibly GNSS/A-GNSS which in combination provides low accuracy (fidelity) proximity values
6. The server confirms that (a) user's risk score is low on both the cellphone and the smartwatch, (b) proximity of devices is below a pre-defined perimeter, but a high margin of error (low fidelity) and (c) the user was able to unlock the workstation. Thus it assesses the user as having a low-risk score on the workstation given the extra certainty given from the smartwatch.
7. The app grants the user access and transitions to the continuous authentication state based on that information.

Figure 3:
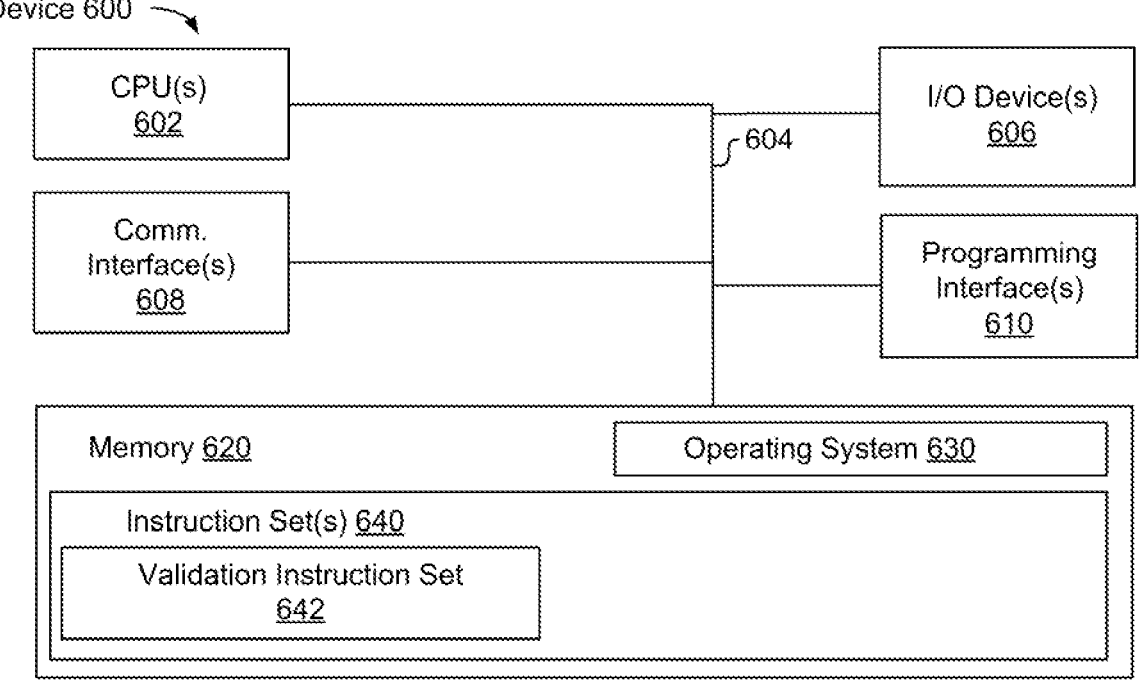
FIG. 3 is a block diagram of device in accordance with some implementations.

FIG. 3 is a block diagram of device 600 in accordance with some implementations. Device 600 illustrates an exemplary device configuration. The device 600 includes one or more processing units 602 (e.g., microprocessors, ASICs, CPUs, processing cores, and/or the like), one or more input/output (I/O) devices 606, one or more communication interfaces 608 (e.g., USB, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, a memory 620, and one or more communication buses 604 for interconnecting these and various other components.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 include validation instruction set 642 configured to, upon execution, provide multi-device user identity validation as described herein. The instruction set(s) 640 may be embodied as a single software executable or multiple software executables.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "deter-mining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipur-pose microprocessor-based computer systems accessing stored software that programs or configures the computing system from a general-purpose computing apparatus to a specialized computing apparatus implementing one or more implementations of the present subject matter. Any suitable programming, scripting, or other type of language or com-binations of languages may be used to implement the teachings contained herein in software to be used in pro-gramming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "compris-ing," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detect-ing," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determi-nation" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor,
      receiving a first set of one or more behavioral signals from a first electronic device, wherein the first elec-tronic device and a second electronic device are within a set of electronic devices associated with a user, wherein the first set of one or more behavioral signals are received as the user is starting or increas-ing use of the second electronic device while using or after using the first electronic device;
      determining that the first and second electronic devices satisfy proximity criteria; and
      in accordance with the first and second electronic devices satisfying the proximity criteria, determining an aggregate score corresponding to confidence in user identity by:
         determining signal-specific-scores comprising a score corresponding to confidence in user identity for each of the one or more behavioral signals of the first set;
         determining a fidelity of each of the signal-specific scores based on determining whether a rate of use of an input device associated with the first elec-tronic device exceeds a threshold or determining whether the first electronic device is currently being held;
         identifying a subset of the signal-signal specific scores corresponding to high fidelity behavioral signals; and determining the aggregate score by aggregating only the subset of the signal-specific specific scores corresponding to high fidelity behavioral signals; and determining a validation state of the second electronic device based on the one or more scores, wherein the validation state is determined based on the aggregate score, wherein user access on the second electronic device is granted, rejected, or withheld pending additional behavioral signals based on the validation state.

2. The method of claim 1, wherein the aggregate score and validation state are determined during a time period during which the second electronic device changes from an idle state to an active state.

3. The method of claim 2, wherein:

while the second device is in the idle state, no behavioral signals are received from the second electronic device; and while the second device is in the active state, one or more behavioral signals are received from the second electronic device.

4. The method of claim 1 further comprising receiving a second set of one or more behavioral signals from the second electronic device, wherein the first set and the second set correspond to a same time period.

5. The method of claim 4, wherein the aggregate score is determined based on the one or more behavioral signals of the second set.

6. The method of claim 5, wherein the aggregate score is determined based on the one or more behavioral signals of the first set and the one or more behavioral signals of the second set.

7. The method of claim 6, wherein determining the aggregate score comprises:

determining a signal-specific-score for each of the one or more behavioral signals of the first set and the second set;

determining a fidelity of each of the signal-specific scores;

identifying a subset of the signal-specific-scores that satisfy a selection criterion based on the fidelity of each of the signal-specific scores; and generating the aggregate score by aggregating the subset of signal-specific-scores.

8. The method of claim 6, wherein determining the aggregate score comprises:

determining a signal-specific-score for each of the one or more behavioral signals of the first set and the second set;

determining a fidelity of each of the signal-specific scores;

weighting the signal-specific-scores based on the fidelity of each of the signal specific scores; and generating the aggregate score by aggregating the subset of signal-specific-scores.

9. The method of claim 1, wherein the set of devices includes only devices that confirm or inherit a valid identity based on scores determined from available behavioral signals.

10. The method of claim 1, wherein the behavior signals include a signal from an input device, a signal from a motion sensor, a signal from an environmental sensor, or a signal from a position sensor.

11. The method of claim 1, wherein determining the one or more scores comprises assessing timing of key entry events, mouse position events, touchscreen events, or user hand positions during hand gesturing.

12. The method of claim 1 further comprising continuing user validation based on behavior signals received simultaneously from both the first electronic device and the second electronic device, wherein the user validation is based on selection or weighting scores associated with behavioral signals from the first electronic device and the second electronic device, wherein the selection or weighting is based on determining changes in signal fidelity of the scores associated with the behavioral signals from the first electronic device and the second electronic device over time.

13. The method of claim 1, wherein the fidelity of at least one of the signal specific scores is determined to be high fidelity based on determining that a rate of typing on a keyboard associated with the first electronic device exceeds the threshold.

14. The method of claim 1, wherein the fidelity of at least one of the signal specific scores provided by an accelerometer on the first electronic device is determined to be high fidelity based on determining that the first electronic device is currently being held by the user.

15. The method of claim 1, wherein the fidelity of at least one of the signal specific scores provided by an accelerometer on the first electronic device is determined to be high fidelity based on determining that the first electronic device is not resting on a surface.

16. The method of claim 1, wherein the fidelity of at least one of the signal specific scores corresponding to a photo or video taken by a camera for facial recognition on the first electronic device is determined to be high fidelity based on determining that the photo or video contains the face.

17. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

receiving a first set of one or more behavioral signals from a first electronic device, wherein the first electronic device and a second electronic device are within a set of electronic devices associated with a user, wherein the first set of one or more behavioral signals are received as the user is starting or increasing use of the second electronic device while using or after using the first electronic device;

determining that the first and second electronic devices satisfy proximity criteria; and in accordance with the first and second electronic devices satisfying the proximity criteria, determining an aggregate score corresponding to confidence in user identity by:

determining signal-specific-scores comprising a score corresponding to confidence in user identity for each of the one or more behavioral signals of the first set;

determining a fidelity of each of the signal-specific scores based on determining whether a rate of use of an input device associated with the first electronic device exceeds a threshold or determining whether the first electronic device is currently being held;

identifying a subset of the signal-signal specific scores corresponding to high fidelity behavioral signals; and determining the aggregate score by aggregating only the subset of the signal-specific specific scores corresponding to high fidelity behavioral signals; and determining a validation state of the second electronic device based on the one or more scores, wherein the validation state is determined based on the aggregate score, wherein user access on the second electronic device is granted, rejected, or withheld pending additional behavioral signals based on the validation state.

18. The system of claim 17, wherein the aggregate score and validation state are determined during a time period during which the second electronic device changes from an idle state to an active state.

19. A non-transitory computer-readable storage medium, storing instructions executable via one or more processors to perform operations comprising:

receiving a first set of one or more behavioral signals from a first electronic device, wherein the first electronic device and a second electronic device are within a set of electronic devices associated with a user, wherein the first set of one or more behavioral signals are received as the user is starting or increasing use of the second electronic device while using or after using the first electronic device;

determining that the first and second electronic devices satisfy proximity criteria; and in accordance with the first and second electronic devices satisfying the proximity criteria, determining an aggregate score corresponding to confidence in user identity by:

determining signal-specific-scores comprising a score corresponding to confidence in user identity for each of the one or more behavioral signals of the first set;

determining a fidelity of each of the signal-specific scores based on determining whether a rate of use of an input device associated with the first electronic device exceeds a threshold or determining whether the first electronic device is currently being held;

identifying a subset of the signal-signal specific scores corresponding to high fidelity behavioral signals; and determining the aggregate score by aggregating only the subset of the signal-specific specific scores corresponding to high fidelity behavioral signals; and determining a validation state of the second electronic device based on the one or more scores, wherein the validation state is determined based on the aggregate score, wherein user access on the second electronic device is granted, rejected, or withheld pending additional behavioral signals based on the validation state.

\*    \*    \*    \*    \*